US012111176B2

(12) United States Patent
Yu et al.

(10) Patent No.: US 12,111,176 B2
(45) Date of Patent: Oct. 8, 2024

(54) LANE LINE MAP CONSTRUCTION USING PROBABILITY DENSITY BITMAPS

(71) Applicant: GM Global Technology Operations LLC, Detroit, MI (US)

(72) Inventors: Bo Yu, Troy, MI (US); Joon Hwang, Pflugerville, TX (US); Gui Chen, Sterling Heights, MI (US); Carl P. Darukhanavala, Royal Oak, MI (US); Vivek Vijaya Kumar, Shelby Township, MI (US); Shu Chen, Rochester Hills, MI (US); Donald K. Grimm, Utica, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 231 days.

(21) Appl. No.: 17/821,898

(22) Filed: Aug. 24, 2022

(65) Prior Publication Data

US 2024/0068836 A1    Feb. 29, 2024

(51) Int. Cl.
G01C 21/30    (2006.01)
G01C 21/00    (2006.01)

(52) U.S. Cl.
CPC ..... G01C 21/3822 (2020.08); G01C 21/3841 (2020.08); G01C 21/3878 (2020.08)

(58) Field of Classification Search
CPC ............ G01C 21/3815; G01C 21/3822; G01C 21/3841; G01C 21/3848; G01C 21/3878
See application file for complete search history.

(56) References Cited

U.S. PATENT DOCUMENTS

| 11,326,889 | B2* | 5/2022 | Kim ...................... G01S 13/867 |
| 2004/0114379 | A1* | 6/2004 | Miller .................... B60Q 1/085 |
| | | | 362/465 |
| 2014/0324339 | A1* | 10/2014 | Adam .................... G01S 13/726 |
| | | | 701/519 |
| 2018/0154901 | A1* | 6/2018 | Hasberg ................ B60W 40/04 |
| 2019/0122386 | A1* | 4/2019 | Wheeler ............ G01C 21/1652 |
| 2019/0154842 | A1* | 5/2019 | Adachi .................. G01C 21/36 |
| 2020/0249332 | A1* | 8/2020 | Pandey ................. G01S 7/4972 |
| 2020/0363218 | A1* | 11/2020 | Kim ....................... G01S 13/931 |

* cited by examiner

Primary Examiner — Tyler J Lee
(74) Attorney, Agent, or Firm — Vivacqua Crane, PLLC

(57) ABSTRACT

A method includes receiving sensor data from a plurality of sensors of a plurality of vehicles. The sensor data includes vehicle GPS data and sensed lane line data of the roadway. The method further includes creating a plurality of multi-layer bitmaps for each of the plurality of vehicles using the sensor data, fusing the plurality of the multi-layer bitmaps of each of the plurality of vehicles to create a fused multi-layer bitmap, creating a plurality of multi-layer probability density bitmaps using the fused multi-layer bitmap, extracting lane line data from the plurality of multi-layer probability density bitmaps, and creating the high-definition (HD) map of the roadway using the multi-layer probability density bitmaps and the lane line data extracted from the plurality of multi-layer probability density bitmaps.

20 Claims, 4 Drawing Sheets

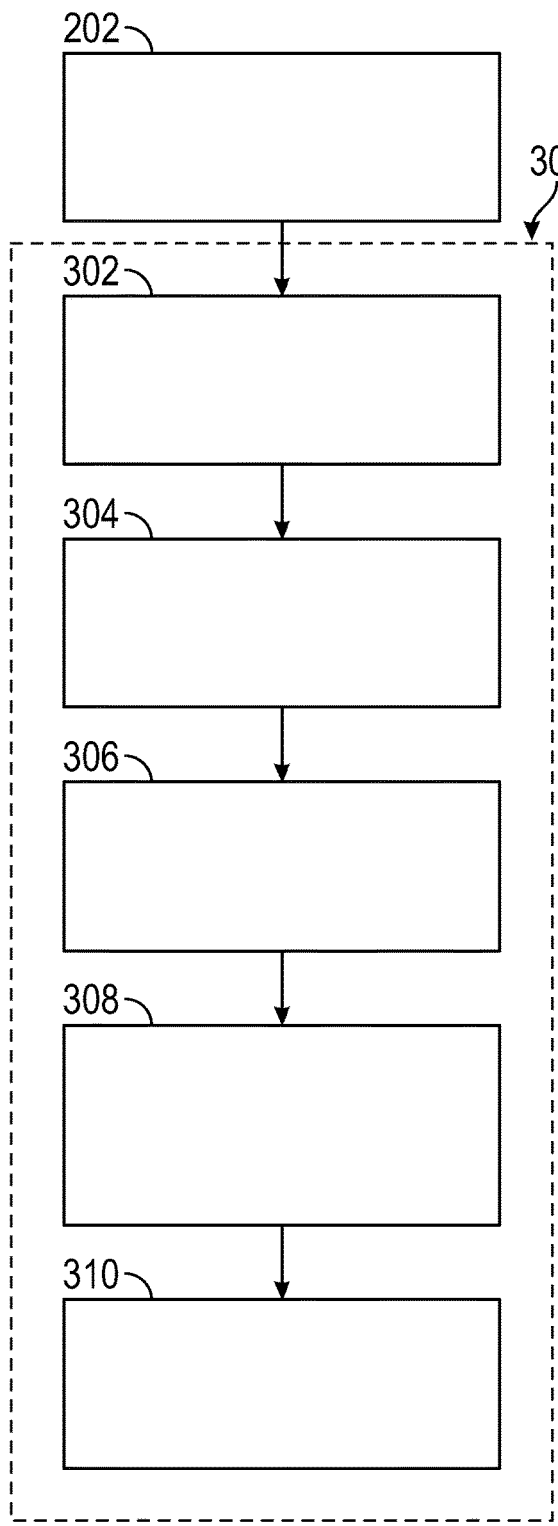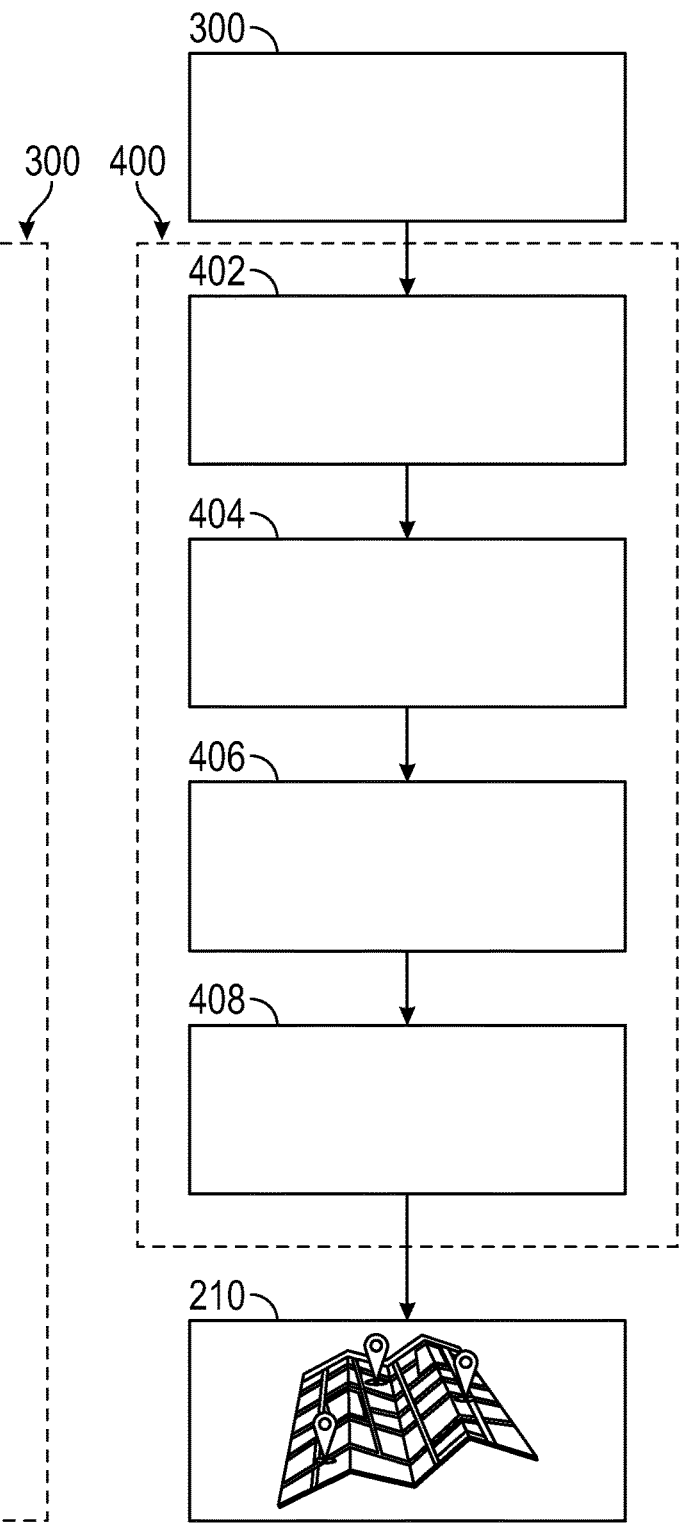

LANE LINE MAP CONSTRUCTION USING PROBABILITY DENSITY BITMAPS

INTRODUCTION

The present disclosure relates to a system and a method for constructing high-definition (HD) maps and, more particularly, to systems and methods for constructing lane line maps using probability density bitmaps.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Currently, HD maps are created using aerial or satellite imaging. Aerial imaging and satellite imaging are, however, quite expensive. Also, constructing HD maps using aerial or satellite imaging may require human labeling. It is therefore desirable to develop a system and method for constructing HD maps using inexpensive, effective, and efficient crowd-sourcing approaches without human labeling.

SUMMARY

The present disclosure describes a method for creating a HD map of a roadway. In an aspect of the present disclosure, the method includes receiving sensor data from a plurality of sensors of a plurality of vehicles. The sensor data includes vehicle GPS data and sensed lane line data of the roadways. In the present disclosure, the term "vehicle GPS data" means data received by the controller from the GPS transceiver that is indicative of the location of the vehicle. The method further includes creating a plurality of multi-layer bitmaps for each of the plurality of vehicles using the sensor data and fusing the plurality of the multi-layer bitmaps of each of the plurality of vehicles to create a fused multi-layer bitmap. Further, the method includes creating a plurality of multi-layer probability density bitmaps using the fused multi-layer bitmap and extracting lane line data from the plurality of multi-layer probability density bitmaps to obtain ext. Also, the method includes creating the HD map of the roadway using the multi-layer probability density bitmaps and the extracted lane line data from the plurality of multi-layer probability density bitmaps. The HD map of the roadway includes a plurality of lane lines of each of the plurality of lanes of the roadway. The method described above improves technology relating to the navigation of autonomous vehicles by creating improved HD map including lane lines using crowdsourcing from numerous vehicles.

In an aspect of the present disclosure, the method includes determining a vehicle pose of each of the plurality of vehicles at different times to create a smooth trajectory of each of the plurality of vehicles using a Bayesian filter.

In an aspect of the present disclosure, the method further includes determining a weight of each lane line sample observed by the plurality of sensors of each of the plurality of vehicles. The weight is a function of a distance from the lane line sample to one of the plurality of vehicles. The method includes filtering out a lane line sample based on the weight of the lane line sample.

In an aspect of the present disclosure, for the sensed lane line data collected by each of the plurality of vehicles, the method further includes transforming a vehicle coordinate system of each of the plurality of vehicles to a geographic coordinate system.

In an aspect of the present disclosure, the sensed lane line sample is one of a plurality of lane line samples. For the sensed lane line data collected by each of the plurality of vehicles, the method further includes combining each of the plurality of lane line samples collected at the different times to create a plurality of continuous and consistent lane lines images.

In an aspect of the present disclosure, for the lane line data collected by each of the plurality of vehicles, the method further includes plotting the lanes lines onto a multi-layer bitmap for each of the plurality of vehicles.

In an aspect of the present disclosure, the method further includes using a kernel density estimation to create the plurality of multi-layer probability density bitmaps.

In an aspect of the present disclosure, creating the plurality of multi-layer probability density bitmaps using the fused multi-layer bitmap includes using a Gaussian blur to create the plurality of multi-layer probability density bitmaps.

In an aspect of the present disclosure, the method further includes extracting lane line attributes from the plurality of multi-layer probability density bitmaps.

In an aspect of the present disclosure, the lane line attributes include a line color and a line type. The line type may be a solid line or a broken (dotted) line.

The present disclosure also describes a tangible, non-transitory, machine-readable medium, including machine-readable instructions, that when executed by one or more processors, cause one or more processors to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 5 is a flowchart of a process for processing sensor data from each individual vehicle; and FIG. 6 is a flowchart of a process for fusing or aggregating multi-layer bitmaps originating from sensor data of multiple vehicles.

DETAILED DESCRIPTION

Figure 1:
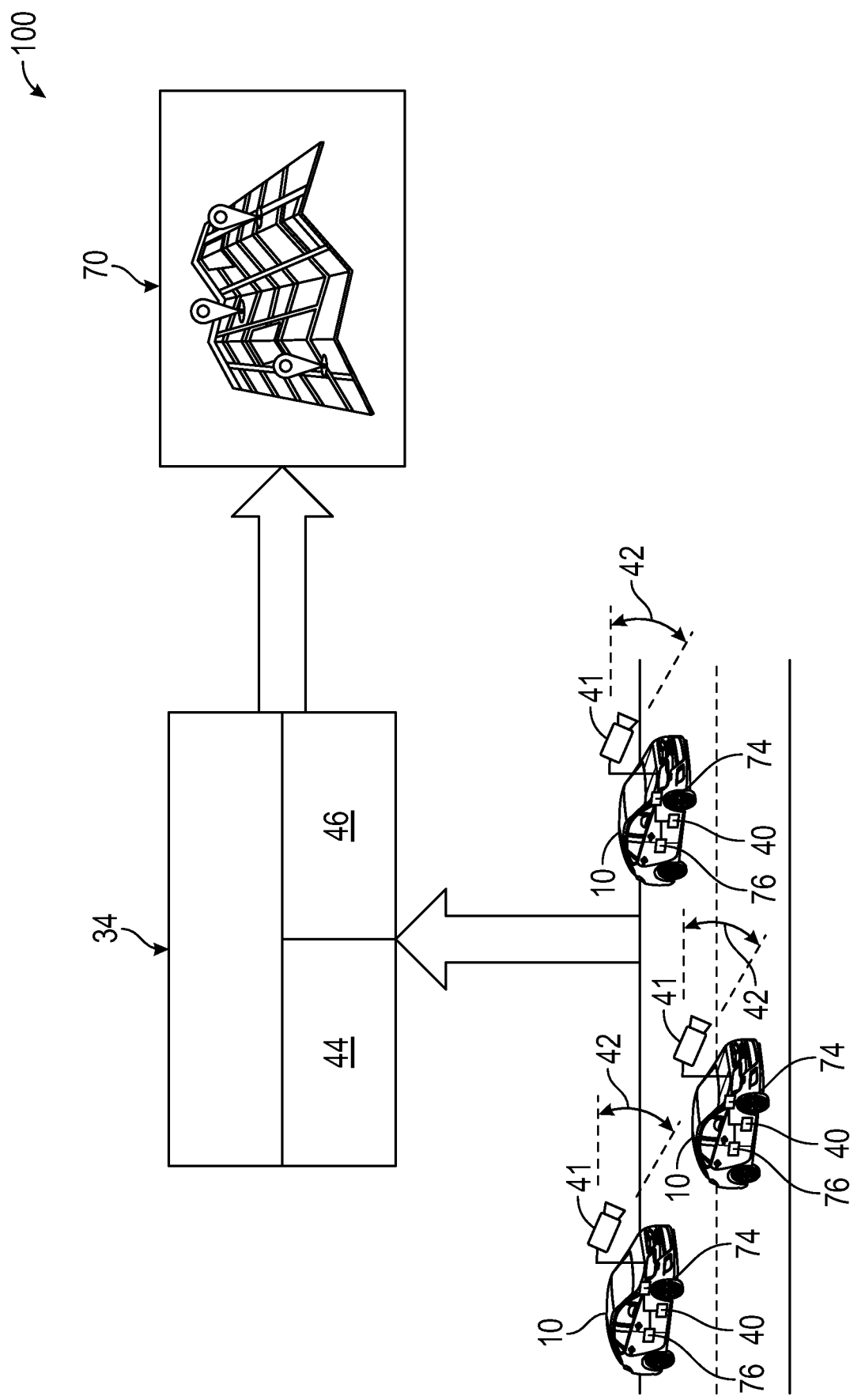
FIG. 1 is a block diagram depicting a system for lane line map construction using probability density bitmaps.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a system 100 includes a plurality of vehicles 10 and a system controller 34 in communication with each of the vehicles 10. As non-limiting examples, the vehicles 10 may be pickup trucks, sedans, coupes, sport utility vehicles (SUVs), recreational vehicles (RVs), etc. Each of the vehicles 10 may be in wireless communication with the system controller 34 and includes one or more sensors 40. The sensors 40 collect information and generate sensor data indicative of the collected information. As non-limiting examples, the sensors 40 may include Global Positioning System (GPS) transceivers, yaw sensors, speed sensors, and forward-facing camera 41. The GPS transceivers are configured to detect the location of each vehicle 10. The speed sensors are configured to detect the speed of each vehicle 10. The yaw sensors are configured to determine the heading of each vehicle 10. The cameras 41 have a field of view 43 large enough to capture images of the roadways 62 in front of the vehicles 10. Specifically, the cameras 41 are configured to capture images of the lane lines 64 of the roadway 62 in front of the vehicles 10 and thereby detect the lane lines 64 of the roadway 62 in front of the vehicle 10. Because the vehicles 10 are in communication with the system controller 34, the system controller 34 is programmed to receive the sensor data from the sensors 40 (e.g., the lane line data from the cameras 41) of the vehicles 10. The lane line data includes lane line geometry data and lane line attribute data detected by the cameras 41 of the vehicles 20. The vehicles 10 are configured to send the sensor data from the sensors 40 to the system controller 34 using, for example, communication transceivers. The sensor data includes GPS data and lane lines data. The GPS data may be received from the GPS transceiver. The lane line data are not images. Rather, the lane line data includes lane lines in the form of polynomial curves reported by the camera 41 (e.g., front camera module) of the vehicle 10. Lane line data are originally from front camera data of the camera 41. However, presently disclosed method 100, the lane lines are processed data (polynomial curves), instead of camera images.

Each vehicle 10 may include one or more vehicle controller 74 in communication with the sensors 40. The vehicle controller 74 includes at least one processor and a non-transitory computer readable storage device or media. The processor may be a custom made or commercially available processor, a central processing unit (CPU), a graphics processing unit (GPU), an auxiliary processor among several processors associated with the vehicle controller 74, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the 44 is powered down. The computer-readable storage device or media of the vehicle controller 74 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 74 in controlling the vehicle 10. For example, the vehicle controller 74 may be configured to autonomously control the movements of the vehicle 10.

Each of the vehicles 10 may include an output device 76 in communication with the vehicle controller 74. The term "output device" is a device that receives data from the vehicle controller 74 and carries data that has been processed by the vehicle controller 74 to the user. As a non-limiting example, the output device 76 may be a display in the vehicle 10.

Figure 2:
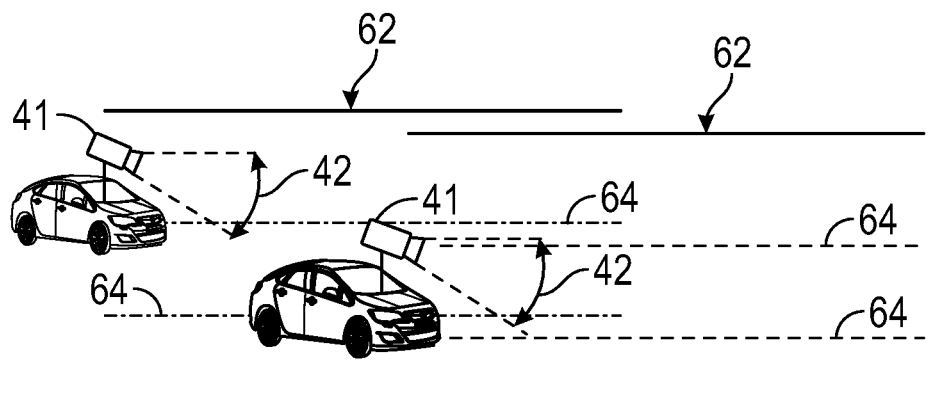
FIG. 2 is a schematic diagram depicting a plurality of vehicles taking images of the lane lines of a roadway.
Figure 3:
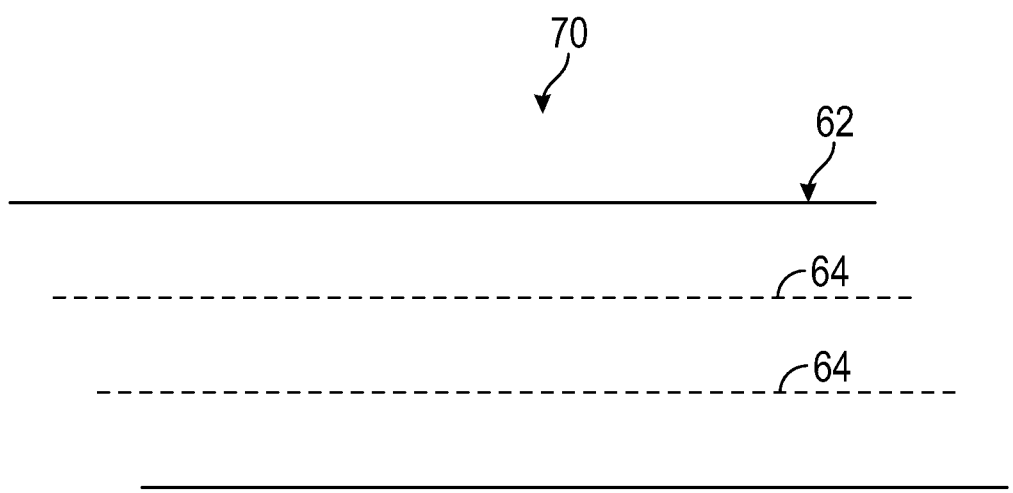
FIG. 3 is a schematic diagram depicting a HD map created by the system of FIG. 1.

With reference to FIGS. 1, 2, and 3, the system controller 34 is programmed to receive the sensor data (e.g., sensed lane line data and vehicle GPS data) from the vehicles 10 and may be configured as a cloud-based system. The sensed lane line data includes information about the lane lines 64 observed by the cameras 41, such as lane line color, lane line type (e.g., solid or broken lines), geometry of the lane line, among other this. The vehicle GPS data is indicative of the location of the vehicle 10. The system controller 34 is configured to receive sensor data collected by the sensors 40 of the vehicles 10. The vehicles 10 sends the sensor data to the system controller 34. Using, among other things, the sensor data from the vehicles 10, the system controller 34 is programmed to construct a lane line map using the probability density bitmaps. Then, the system controller 34 outputs a high-definition (HD) map, including details about the lane lines 64 of the roadway 62. In the present disclosure, the term "HD map" means a highly precise map used in autonomous driving, which contains details at a centimeter level. As shown in FIG. 3, the HD map 70 includes a representation of the roadway 62 and the lane lines 64 in the roadway 62. In the present disclosure, the term "lane line" means a solid or broken paint line or other marker line separating lanes of traffic moving in the same direction or opposite directions. HD map 70 may be shown to the vehicle user through the output device 76 (e.g., display).

The system controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the system controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions. The system controllers 34 may be programmed to execute the methods below described in detail below, such as the method 200 (FIG. 4).

The instructions may include one or more separate programs, each of which comprises an ordered listing of executable instructions for implementing logical functions. The instructions, when executed by the processor 44, receive and process signals from the sensors 40, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single system controller 34 is shown in FIG. 1, embodiments of the system 100 may include a plurality of system controllers 34 that communicate over a suitable communication medium or a combination of communication mediums and that cooperate to process the sensor signals, perform logic, calculations, methods, and/or algorithms, and generate control signals to automatically control features of the system 100. In various embodiments, one or more instructions of the system controller 34 are embodied in the system 98. The non-transitory computer readable storage device or media 46 includes machine-readable instructions (shown, for example, in FIG. 4), that when executed by the one or more processors, cause the processors to execute the method 200 (FIG. 4).

Figure 4:
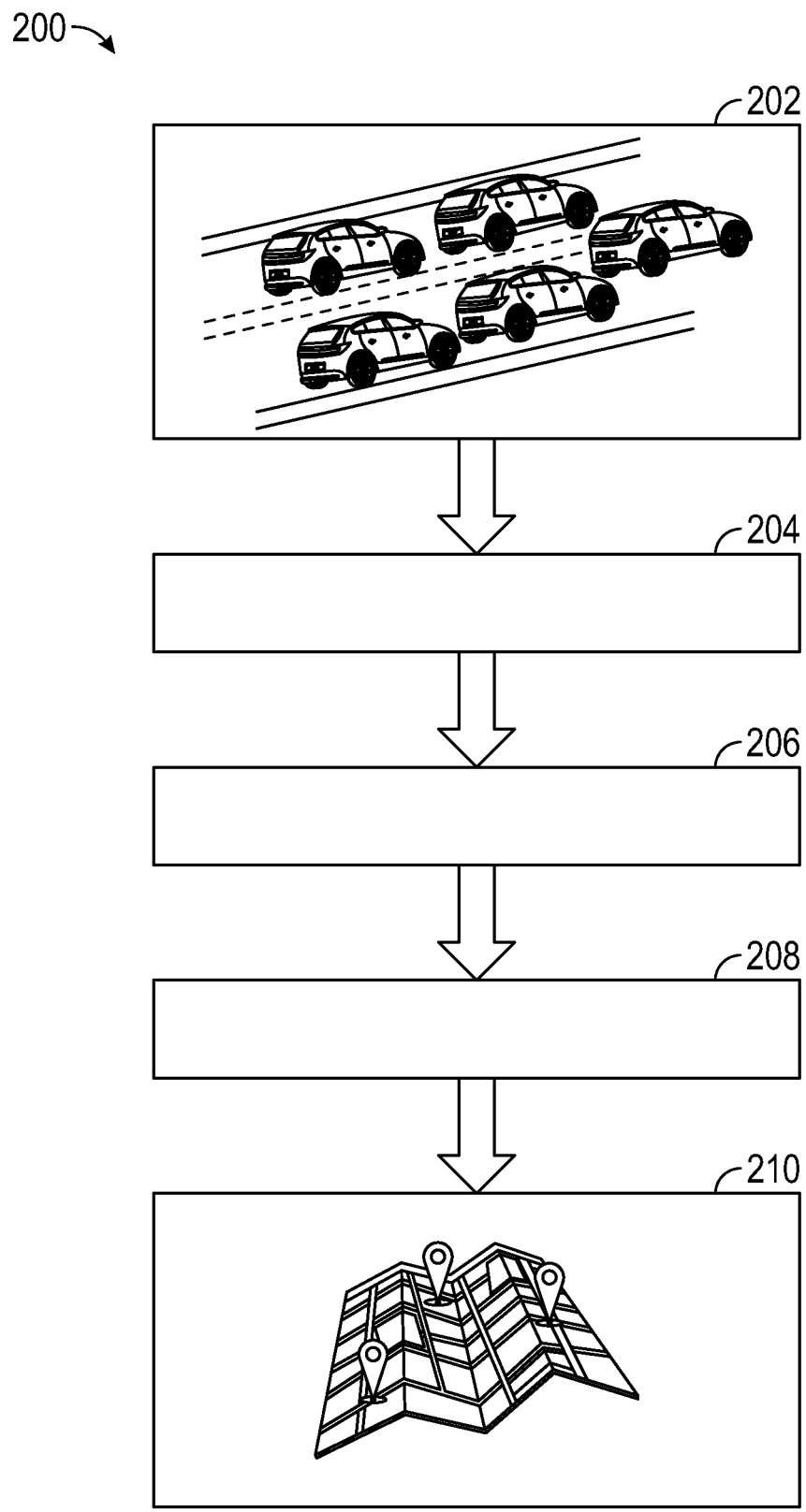
FIG. 4 is a flowchart of a method for constructing lane line maps using probability density bitmaps.

FIG. 4 is a flowchart of the method 200 for constructing lane line maps using probability density bitmaps. The system controller 34 is programmed to execute the method 200, and the method 200 begins at block 202. At block 202, the system controller 34 crowdsources sensor data about to the lane lines 64 of one or more roadways 62. In other words, at block 202, the system controller 34 receives sensor data about the lane lines 64 from a plurality of vehicles 10 (e.g., thousands of vehicles 10). As discussed above, the sensor data is collected by the sensors 40 of the vehicles 10. For example, the sensor data may include images (i.e., image data) captured by the cameras 41 of the vehicles 10. These images show the lane lines 64 of the roadway 62. Then, the method 200 proceeds to block 204.

At block 204, the system controller 34 executes a GPS bias correction. In other words, the system controller 34 corrects an internal bias of the GPS transceiver (i.e., one of the sensors 40) to output a more accurate location of the vehicle 10. Then, the method 200 continues to block 206.

At block 206, the system controller 34 executes a GPS random noise reduction process. In other words, the system controller 34 may reduce the noise from the GPS transceiver (i.e., one of the sensors 40) to output a more accurate location of the vehicle 10. Then, the method 200 continues to block 208.

At block 208, the system controller 34 constructs a bitmap-based lane line map using the sensor data collected by the sensors 40 of the plurality of vehicles 10. In doing so, the system controller 34 may use GPS data, lane line data, heading data, and speed data of the plurality of vehicles 10. Specifically, the system controller 34 creates a plurality of multi-layer bitmaps for each of the vehicles 10 using the sensor data. Then, the system controller 34 aggregates or fuses creates the multi-layer bitmaps of each of the vehicles 10 to create multi-layer probability density bitmaps to represent the observed lane lines. The system controller 34 then extracts lane line data (e.g., geometry, type (i.e., solid or broken), and color of the lane lines 64) from the multi-layer probability density bitmaps to create the HD map 70 of the roadway 62 using multi-layer probability density bitmaps. Next, the method 200 continues to block 210.

At block 210, the system controller 34 outputs the HD map 70 of the roadway 62, which includes lane lines 64. The system controller 34 may send the HD map 70 of the roadway 62 to the vehicle controller 74. The vehicle controller 74 may then command the output device 76 (e.g., display) to show the HD map 70 of the roadway 62. Once the vehicle controller 74 receives the HP map of the roadway 62, the vehicle controller 74 may autonomously control the movement of the vehicle using the HD map 70 of the roadway 62. The block 208 also includes some or part of the process 300 (FIG. 5) and the process 400 (FIG. 6).

FIG. 5 is a process 300 for processing sensor data from each individual vehicle 10. Before beginning the process 300, the sensor data is collected from each of the vehicles 10 as described above with respect to FIG. 4. The process 300 may run on the vehicle controller 74 of each individual vehicle 10 and/or on the system controller 34, which may be part of a cloud-based system. Accordingly, the vehicle controller 74 of each vehicle 10 and/or the system controller 34 may be programmed to execute the process 300. The process 300 begins at block 302.

At block 302, the vehicle pose of each of the vehicles 10 is determined (e.g., estimated) using the sensor data received from the sensors 40 of the vehicle 10. Specifically, the location of the vehicle 10 (i.e., the GPS data receives from the GPS transceiver), the speed of the vehicle 10 collected from the speed sensor), and the heading of the vehicle 10 collected or estimated from the yaw sensor of the vehicle 10. The raw sensor data of the vehicle 10 may be collected at different times and may include the location of the vehicle 10 (e.g., longitude and latitude of the location of the vehicle 10), the heading of the vehicle 10, the speed of the vehicle 10, the yaw of the vehicle 10, among others. At block 302, a Bayesian filter (e.g., Kalman, Particle, etc.) may filter the raw sensor data. The output of the step of block 302 is a smooth vehicle trajectory (i.e., the longitude, latitude and heading for each timestamp). Then, the process 300 continues to block 304.

At block 304, the vehicle controller 74 and/or on the system controller 34 determine the weights the lane lines 64 observed by the cameras 41 at different times (i.e., timestamps) with low weights and filters out the lane lines observations with low weights. The timestamps may be the same as the timestamps described above for the vehicle pose. The vehicle controller 74 and/or on the system controller 34 may determine (i.e., calculate) a weight from different segments of the lane lines 64. As non-limiting examples, the weight may be a function of a confidence value reported by the cameras 41 and/or the distance from the lane line segment to the vehicle 10 (e.g., the longitudinal distance, the lateral distance, and/or radial distance). Once the weights are determined, the vehicle controller 74 and/or the system controller 34 compares the weights of each lane line sample with a predetermined weight threshold. Then, the vehicle controller 74 and/or the system controller 34 filters out the lane line samples that have weights that are less than the predetermined weight threshold. The output of block 304 are lane line segments with updated weights. Then, the process 300 continues to block 306.

At block 306, the vehicle controller 74 and/or the system controller 34 transforms the multiple lane lines 64 observed by the cameras 41 at different times (i.e., timestamps) from a local vehicle coordinate system to a global coordinate system described in global longitudes and latitudes. Next, the process 300 continues to block 308.

At block 308, the vehicle controller 74 and/or on the system controller 34 generate continuous and consistent lane lines images by combining the lane line observations collected by the camera 41 at different times (i.e., timestamps). Therefore, the output of block 308 is consistent lane lines images for the entirety of the trip of the vehicle 10. To generate the consistent lane lines images, the vehicle controller 74 and/or the system controller 34 determine the distance traveled by the vehicle 10 from a first time (i.e., first timestamp when the lane line observation by the camera 41 occurred) to a second time (i.e., second timestamp when the lane line observation by the camera 41 occurred). Next, the vehicle controller 74 and/or the system controller 34 truncate the observed lane line at the first timestamp. Then, the vehicle controller 74 and/or the system controller 34 concatenate the truncated lane lines at the different timestamps. Two lane line segments may be concatenated based on their position offset, the line color, the line type, among others. Then, the vehicle controller 74 and/or the system controller 34 run one or more clustering algorithms, such as the unsupervised curve clustering using B-splines, to remove noise from the lane line observation at the different timestamps. The clustering may be based on the line position, the line type, the line color, among others. Then, a spline curve is created for each cluster of lines. The spline curves are then saved as the output (i.e., lane lines 64). Then, the process 300 continues to block 310.

At block 310, the vehicle controller 74 and/or the system controller 34 create a multi-layer bitmap for each of the plurality of vehicles 10. To do so, the vehicle controller 74 and/or the system controller 34 plot the lane lines onto a multi-layer bitmap data structure. Specifically, block 310 starts with a geographical map representing a geographical area within a rectangular bounding box. Each pixel of the geographical area may be an integer or a float, representing information at the geographical area within the rectangular bounding box. The lane lines are plotted onto the pixels, changing, for example, the value from 0.0 to 1.0. A pixel may be plotted by multiple lane lines. For example, a value of 2.0 may represent two lane lines. The pixel value may, for example, be increased partially based on the weight of the lane line 64. For example, the pixel value may increase from 0.0 to 0.1 based on the weight of the lane line 64. Therefore, the output of block 310 is a multi-layer bitmap for each individual vehicle 10. The multi-layer bitmap includes a representation of the lane lines 64 and multiple layers. The layers represent attributes of the lane lines 64, such as line color and line type. The line color may include, but is not limited to, white lines and yellow lines. The line type may include, but is not limited to, solid lines and broken lines. The output of the process 300 for each of the plurality of vehicles 10 serves as an input from the process 400.

FIG. 6 is a flowchart of a process 400 for fusing or aggregating multi-layer bitmaps originating from sensor data of multiple vehicles 10. As an input, the process 400 uses the multi-layer bitmaps originating from sensor data of multiple vehicles 10 generated by the process 300 and begins at block 402. At block 402, the system controller 34 fuses together the multi-layer bitmaps originating from sensor data of multiple vehicles 10 to create bitmaps representing separate layers. As discussed above, the layers may represent attributes of the lane lines 64, such as lane color and lane type. The separate layers of bitmaps may be further fused into a bitmap of all the layers. For example, the system controller 34 may fuse all the layers of different vehicles 10 representing the white lane line 64 to create a fused bitmap of all the same type of layers (e.g., white line) of different vehicles 10. In another example, the system controller 34 may fuse all the layers of different vehicles 10 representing the yellow lane line 64 to create a fused bitmap of all the same type of layers (e.g., yellow line) of different vehicles 10. The bitmaps of separate type of layers (e.g., white lines and yellow lines) are then fused together to form a fused bitmap of all layers. The fusion function is a function of multiple input bitmaps. An example is a summation function as follows:

$$P(x, y) = \sum_{i=0}^{n} P_i(x, y)$$

where $P_i(x,y)$ means the pixel value (brightness) at $(x,y)$ from the i'th input bitmap;

n the number of input bitmaps; and $P(x,y)$ means the fused pixel value (brightness) at $(x,y)$.

This fusion function may be used to generate the fused bitmaps of separate layers and/or the fused bitmap of all layers. Then, the process 400 continues to block 404.

At block 404, the system controller 34 applies a kernel density estimation (KDE) to the multi-layer fused bitmaps to generate multi-layer probability density bitmaps. Each multi-layer probability density bitmap is a probability density function, which is a function whose value at any given sample (or point) in the sample space (the set of possible values taken by the random variable) can be interpreted as providing a relative likelihood that the value of the random variable would be close to that sample. Other methods, such as Gaussian blur, may be used instead of KDE. Then, the process 400 continues to block 406.

At block 406, the system controller 34 constructs the lane lines using the multi-layer probability density bitmaps. To do so, the system controller 34 may use a local search algorithm, such as the hill climbing algorithm. In the probability density bitmap, each pixel (x,y) represents the probability of a lane line observed by crowdsourcing vehicles 10 at a location (longitude, latitude). The pixel coordinates (x,y) may be uniquely converted to or from the global coordinates. The brightness of a pixel represents the probability of an observed lane line. A pixel brightness value of zero represents zero probability of a lane line 64, and a pixel brightness value of one represents a 100% probability of a lane line 64. The output of block 404 will be multiple lane lines at points that represent the lane lines. Then, the process 400 continues to block 408.

At block 408, the system controller 34 extracts lane line attributes (e.g., line color, line type, etc.) from the multi-layer bitmap structure. For example, the lane line attributes may be determined by analyzing the fused probability density bitmaps of separate layers. To do so, the system controller 34 may use the following equation:

Layer$_j$=argmax$_j$(pixel(layer$_j$,x$_i$,y$_i$)

where:
  layer$_j$ is the fused probability density bitmaps of separate layers;
  (x$_i$, y$_i$) is a point in the fused probability density bitmaps of separate layers;
  the pixel( ) function returns the pixel value at point (x$_i$, y$_i$) from layer$_j$ bitmap; and
  the argmax$_j$( ) function returns the layer number which has the maximal pixel( ) value.

Then, at block 210, the system controller 34 then uses then lane line attributes at block 408 and the lane lines constructed at block 406 to develop and output the HD map 70 of the roadway 62, which includes lane lines 64.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method of creating a high-definition (HD) map of a roadway, comprising:
   receiving sensor data from a plurality of sensors of a plurality of vehicles, wherein the sensor data includes vehicle GPS data received from a plurality of GPS transceivers of the plurality of vehicles, and the sensor data includes sensed lane line data of the roadway received from a plurality of cameras from the plurality of vehicles;
   creating a plurality of multi-layer bitmaps for each of the plurality of vehicles using the sensor data;
   fusing the plurality of the multi-layer bitmaps of each of the plurality of vehicles to create a fused multi-layer bitmap;
   creating a plurality of multi-layer probability density bitmaps using the fused multi-layer bitmap;
   extracting lane line data from the plurality of multi-layer probability density bitmaps to obtain extracted lane line data; and
   creating the HD map of the roadway using the multi-layer probability density bitmaps and the extracted lane line data from the plurality of multi-layer probability density bitmaps, wherein the HD map of the roadway includes a plurality of lane lines of each of the plurality of lanes of the roadway, thereby improving vehicle navigational technology; and
   showing the HD map on a display of a host vehicle.

2. The method of claim 1, further comprising determining a vehicle pose of each of the plurality of vehicles at different times using a Bayesian filter.

3. The method of claim 2, further comprising:
   determining a weight of each lane line sample observed by the plurality of sensors of each of the plurality of vehicles, wherein the weight is a function of a distance from the lane line sample to one of the plurality of vehicles; and
   filtering out the lane line data of the lane line sample based on the weight of the sensed lane line data.

4. The method of claim 3, wherein, for the sensed lane line data collected by each of the plurality of vehicles, the method further comprises transforming a vehicle coordinate system of each of the plurality of vehicles to a geographic coordinate system.

5. The method of claim 4, wherein the lane line sample is one of a plurality of lane line samples, for the sensed lane line data collected by each of the plurality of vehicles, the method further comprises combining each of the plurality of lane line samples collected at the different times to create a plurality of continuous and consistent lane lines images.

6. The method of claim 5, wherein, for the sensed lane line data collected by each of the plurality of vehicles, the method further comprises plotting the lanes lines onto a multi-layer bitmap for each of the plurality of vehicles.

7. The method of claim 6, wherein creating the plurality of multi-layer probability density bitmaps using the fused multi-layer bitmap includes using a kernel density estimation to create the plurality of multi-layer probability density bitmaps.

8. The method of claim 6, wherein creating the plurality of multi-layer probability density bitmaps using the fused multi-layer bitmap includes using a Gaussian blur to create the plurality of multi-layer probability density bitmaps.

9. The method of claim 7, wherein extracting the lane line data from the plurality of multi-layer probability density bitmaps includes extracting lane line attributes from the plurality of multi-layer probability density bitmaps.

10. The method of claim 9, wherein the lane line attributes include a line color and a line type, and the line type is at least one of a solid line or a broken line.

11. A tangible, non-transitory, machine-readable medium, comprising machine-readable instructions, that when executed by one or more processors, cause the processors to:

receive sensor data from a plurality of sensors of a plurality of vehicles, wherein the sensor data includes vehicle GPS data received from a plurality of GPS transceivers from the plurality of vehicles, and the sensor data includes sensed lane line data of a roadway received from a plurality of cameras of the plurality of vehicles;

create a plurality of multi-layer bitmaps for each of the plurality of vehicles using the sensor data;

fuse the plurality of the multi-layer bitmaps of each of the plurality of vehicles to create a fused multi-layer bitmap;

create a plurality of multi-layer probability density bitmaps using the fused multi-layer bitmap;

extract lane line data from the plurality of multi-layer probability density bitmaps to obtain extracted lane line data; and create a high-definition (HD) map of the roadway using the multi-layer probability density bitmaps and the extracted lane line data from the plurality of multi-layer probability density bitmaps, wherein the HD map of the roadway includes a plurality of lane lines of each of the plurality of lanes of the roadway, thereby improving vehicle navigational technology; and showing the HD map on a display of a host vehicle.

12. The machine-readable medium of claim 11, further comprising machine-readable instructions, that when executed by the processors, cause the processors to:

determine a vehicle pose of each of the plurality of vehicles at different times using a Bayesian filter.

13. The machine-readable medium of claim 12, further comprising machine-readable instructions, that when executed by the processors, cause the processors to:

determine a weight of the lane line data of each of a plurality of lane line samples collected by the plurality of sensors of each of the plurality of vehicles;

compare the weight of the lane line data of each of the plurality of lane line samples collected by the plurality of sensors with a predetermined weight threshold to determine whether the weight of the sensed lane line data of each of the plurality of lane line samples is less than the predetermined weight threshold; and filter out the lane line data of each of the plurality of lane line samples having the weight that is less than the predetermined weight threshold.

14. The machine-readable medium of claim 13, further comprising machine-readable instructions, that when executed by the processors, cause the processors to:

transform a vehicle coordinate system of each of the plurality of vehicles to a geographic coordinate system.

15. The machine-readable medium of claim 14, wherein the machine-readable medium further comprises machine-readable instructions, that when executed by the processors, cause the processors to:

combine each of the lane line samples collected at the different times to create a plurality of continuous and consistent lane lines images.

16. The machine-readable medium of claim 15, further comprising machine-readable instructions, that when executed by the processors, cause the processors to:

plot the lanes lines images onto a multi-layer bitmap for each of the plurality of vehicles.

17. The machine-readable medium of claim 16, further comprising machine-readable instructions, that when executed by the processors, cause the processors to:

using a kernel density estimation to create the plurality of multi-layer probability density bitmaps.

18. The machine-readable medium of claim 16, further comprising machine-readable instructions, that when executed by the processors, cause the processors to:

use a Gaussian blur to create the plurality of multi-layer probability density bitmaps.

19. The machine-readable medium of claim 18, further comprising machine-readable instructions, that when executed by the processors, cause the processors to:

extract lane line attributes from the plurality of multi-layer probability density bitmaps.

20. The machine-readable medium of claim 19, wherein the lane line attributes include a line color and a line type.

* * * * *